United States Patent [19]
Denk et al.

[11] Patent Number: 4,741,094
[45] Date of Patent: May 3, 1988

[54] TWO POLE PERMANENT MAGNET ROTOR CONSTRUCTION METHOD

[75] Inventors: Joseph Denk, Manhattan Beach; Kenneth L. Wuertz, Torrance, both of Calif.

[73] Assignee: The Garrett Corporation, Los Angeles, Calif.

[21] Appl. No.: 945,105

[22] Filed: Dec. 22, 1986

Related U.S. Application Data

[62] Division of Ser. No. 800,183, Nov. 20, 1985, Pat. No. 4,667,123.

[51] Int. Cl.⁴ .............................................. H02K 15/02
[52] U.S. Cl. ........................................ 29/598; 29/736; 310/42; 310/156
[58] Field of Search .................... 29/598, 232, 736; 310/42, 156, 261, 263, 270, 256

[56] References Cited

U.S. PATENT DOCUMENTS

| | | | |
|---|---|---|---|
| 3,513,341 | 5/1970 | Gratzmuller | 310/156 |
| 4,433,261 | 2/1984 | Nashiki et al. | 310/156 |
| 4,562,641 | 1/1986 | Mosher et al. | 29/598 |
| 4,587,450 | 5/1986 | Otaki | 310/156 |
| 4,617,726 | 10/1986 | Denk | 29/598 |

*Primary Examiner*—Carl E. Hall
*Attorney, Agent, or Firm*—Albert J. Miller; David B. Abel

[57] ABSTRACT

A two pole permanent magnet rotor which utilizes a single cylindrical two pole permanent magnet mounted between two end pieces and surrounded by a retaining hoop. The cylindrical two pole permanent magnet, which is made of high energy product material, is "straight through" diametrically magnetized to provide a sinusoidal air gap flux distribution which eliminates losses due to harmonics. The cylindrical two pole permanent magnet may be made of a plurality of smaller magnet blocks which are stacked and machined to form cylindrical configuration.

11 Claims, 2 Drawing Sheets

TWO POLE PERMANENT MAGNET ROTOR CONSTRUCTION METHOD

This is a division of application Ser. No. 800,183 filed Nov. 20, 1985; issued as U.S. Pat. No. 4,667,123.

BACKGROUND OF THE INVENTION

1. Field of the Invention

The present invention relates generally to the construction and configuration of a rotor for electrical machines including both motors and generators, and more particularly to an improved two pole rotor construction with the entire portion of the rotor between two end pieces being a diametrically magnetized solid cylindrical two pole magnet, which construction provides the maximum possible magnetomotive force for a given permanent magnet rotor size, thereby allowing a larger magnetic air gap than found in machines having conventional rotors and also facilitating the use of toothless stator construction.

In the design and construction of permanent magnet machines, there are two considerations which dictate the design of an improved permanent magnet machine having great appeal to a potential purchaser. These two factors are, first, the desire to minimize the cost of the machine, or to provide the most machine for the least money, and secondly to increase machine efficiency while reducing machine size by utilizing the ever-increasing high energy product permanent magnets.

With regard to the first of these factors, the desire to minimize construction cost of a permanent magnet machine, it is highly desirable to utilize a toothless stator construction such as that taught in Assignee's concurrently filed U.S. patent application Ser. No. 800,184, entitled "Toothless Stator Construction for Electrical Machines", which patent application is hereby incorporated herein by reference. The use of a toothless stator construction necessarily requires that the magnetic air gap is considerably larger than that generally encountered in existing machines, so it is necessary that the permanent magnet rotor provide the maximum possible magnetomotive force to make practical a machine with such a large magnetic air gap. A second consideration with regard to minimizing construction cost of a permanent magnet machine is that the rotor assembly have the minimum possible number of parts, thereby reducing both labor and part cost as much as possible.

Typical state-of-the-art rotor construction utilizes a minimum of four individual precision machined magnets, a precision machined ferro-magnetic support yoke, and an aluminum cage consisting of spacers and rings and used to position and support the individual magnets. Construction of such conventional permanent magnet rotors typically includes at least 12 individual parts contained in the rotor, each of which must be precision machined to result in proper mechanical fit of the various parts. It may be appreciated that the high parts count and precision machining requirements result in relatively expensive rotor fabrication costs.

It is therefore an object of the present invention to reduce both the number of parts contained in the rotor and the rotor fabrication time, which is mainly due to precision machining of the various parts contained in the rotor. It may be appreciated that by accomplishing a substantial reduction in the cost of the rotor, while simultaneously utilizing the substantially cheaper toothless stator construction described in the above-referenced copending patent application, the overall construction cost of a permanent magnet machine may be substantially reduced.

The second objective of the present invention is to maximize machine efficiency and provide in a reduced size and weight package a machine having equivalent power and at least equivalent efficiency of a larger conventional machine. In order to reduce the size of the machine without reducing efficiency or output of the machine, it is necessary that the permanent magnet rotor provide the maximum possible magnetomotive force for a given rotor size. By so doing, the rotor of the present invention may be used with the toothless stator construction referenced above to construct a compact, efficient electrical machine having substantially no disadvantages.

It is an objective, therefore, of the present invention to accomplish both a substantial reduction in cost of machine construction, and a substantial reduction in machine size and weight with no reduction in efficiency while providing the same output as a larger machine. It will be appreciated that in accomplishing these objectives, the present construction will provide a highly advantageous rotor construction.

SUMMARY OF THE INVENTION

The present invention accomplishes the objectives described above by providing a rotor having only four parts. The most important of these parts is a single solid cylindrical two pole magnet which is "straight through" diametrically magnetized. By "straight through" diametrically magnetized it is meant that the cylindrical magnet has its magnetic axis along a single diameter of the rotor. The cylindrical magnet is magnetized with all flux lines parallel to that magnetic axis to produce a sinusoidal air gap flux distribution which eliminates losses due to harmonics in the magnetic field. The cylindrical solid magnet is mounted between two end pieces made of non-magnetizable material, and the resulting assembly then has a cylindrical retaining hoop or sleeve also made of non-magnetizable material mounted in interference fit about the cylindrical magnet and portions of the two end pieces.

The rotor of the present invention thereby may be conveniently constructed of four pieces, significantly reducing the amount of precision machining required by previous rotor designs. This significant reduction in rotor parts count has two advantages. First, since there are only four parts contained in the rotor, and since far less precision machining of parts is required, the cost of construction of the rotor is substantially reduced. Secondly, since the parts count of the rotor is reduced, the overall stiffness of the rotor is substantially increased, which results in a rotor operable at higher speeds, thus allowing higher output from the same size.

Since the rotor of the present invention utilizes a solid cylindrical magnet which forms a substantial percentage of the total volume of the rotor, the maximum possible magnetomotive force is generated for any given rotor size. Accordingly, the rotor of the present invention may be used with a large air gap, and will be functional with the toothless stator construction referenced above. The use of the rotor of the present invention with toothless stator construction will result in a machine having a substantially increased power output per machine volume and weight, with no reduction in efficiency. Typically, use of the rotor of the present invention with a toothless stator will also result in reduced losses, and an even more efficient machine in a smaller package.

It may therefore be appreciated that the present invention provides a rotor which may be used to produce a high power density machine typically having increased efficiency. This machine may be constructed at a lower cost than conventional machines, partly due to a significant reduction in rotor construction costs due to the design of the present invention. Hence, it may be appreciated that the present invention provides a highly desireable rotor construction having the significant advantages enumerated above while presenting no significant disadvantages in achieving those advantages.

DESCRIPTION OF THE DRAWINGS

These and other advantages of the present invention are best understood through reference to the drawings, in which.

DETAILED DESCRIPTION OF THE PREFERRED EMBODIMENT

Figure 1:
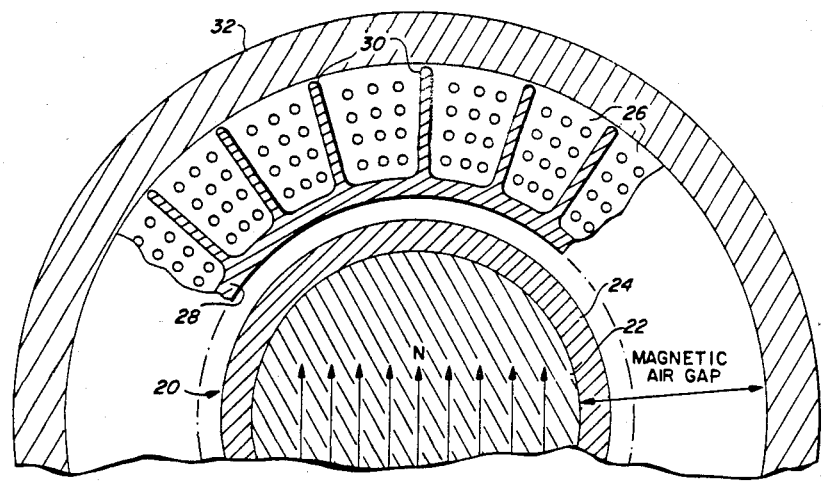
FIG. 1 is a schematic cross-sectional view of a toothless stator construction shown with a two-pole rotor.

A machine utilizing a toothless stator is shown in schematic fashion in FIG. 1 with a two pole rotor assembly 20 having a two pole permanent magnet rotor 22 shown in schematic fashion, wherein rotor 22 is surrounded by a retaining hoop 24 made of non-magnetizable material.

Figure 4:
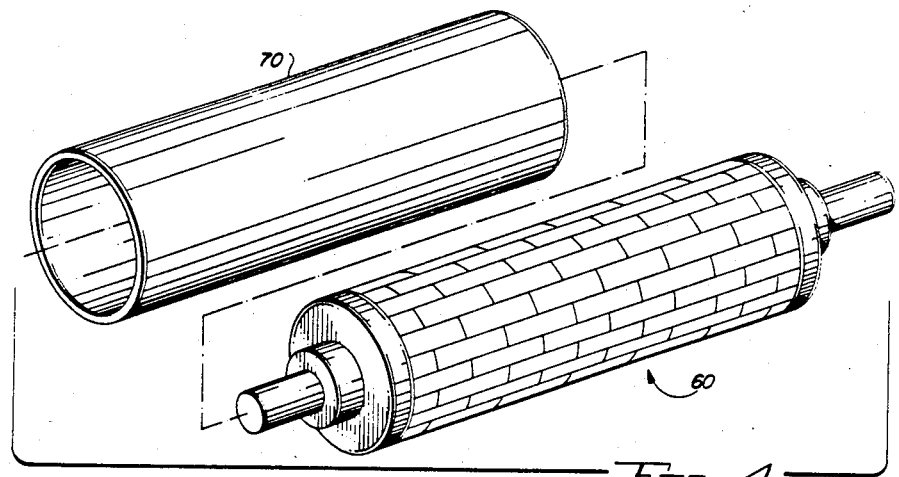
FIG. 4 is an exploded view of the assembled rotor parts shown in FIG. 2 and the retaining hoop.

The toothless stator illustrated in FIG. 4 has stator windings 26 which are mounted on a winding support structure 28 made of non-magnetizable material, which winding support structure 28 has a cylindrical portion with radially outwardly extending longitudinal support fins 30 mounted thereto. The support fins 30, which extend longitudinally along the cylindrical portion of the winding support structure 28 except on the two ends thereof, provide the areas into which the stator windings 26 may be inserted.

Construction of the stator is facilitated by the fact that the stator windings 26 may be laid into the outer side of the winding support structure 28, and therefore the stator windings 26 may be prefabricated resulting in reduced labor cost. The flux path is completed by a cylindrical flux collector ring 32 made of ferromagnetic material which is mounted about the outer periphery of the winding support structure 28, with the flux collector ring 32 extending around the outermost edges of the support fins 30 on the winding support structure 28. Details of the construction of the toothless stator schematically illustrated in FIG. 1 are given in the above-referenced disclosure.

As illustrated in FIG. 1, the magnetic air gap of this machine extends from the outer periphery of the two pole permanent magnet rotor 22 to the inner periphery of the flux collector ring 32. Such a large magnetic air gap would not be feasible with low energy product magnets, but recently developed high energy product magnets make the large magnetic air gap a problem which may be overcome. It is first necessary that the magnets in the two pole rotor 22 are high energy product magnets such as samarium cobalt or neodymium-iron-boron magnets, the former of which are presently available with magnetic energy products of 27 megagauss-oersted (MGO) and the latter of which are available with magnetic energy products of 35 MGO.

As mentioned above, it is desireable that the two pole rotor 22 schematically illustrated in FIG. 1 have the maximum possible magnetomotive force to allow the machine illustrated in FIG. 1 to function with the large magnetic air gap. It is apparent that the limit on the size of the magnet contained in a rotor is 100% of the area carrying the magnet or magnets, and the attainment of this 100% absolute maximum is the accomplishment of the present invention.

Figure 2:
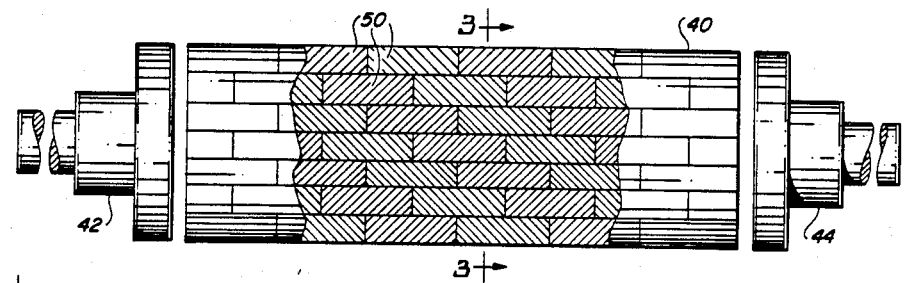
FIG. 2 is an exploded, partially cutaway view of a rotor constructed according to the teachings of the present invention prior to installation of the retaining hoop.

The present invention utilizes a "straight through" diametrically magnetized solid cylindrical two-pole magnet, which cylindrical magnet is contained between two end pieces and surrounded by a cylindrical retaining hoop. Such a rotor is illustrated in FIG. 2 without the outer shell. The "straight through" diametrically magnetized two pole magnet has its magnetic axis along a single diameter of the rotor. The magnet is therefore magnetized with all flux lines therethrough parallel to that magnetic axis, to produce a sinusoidal air gap flux which eliminates harmonics related losses in the rotor and stator assemblies. A solid cylindrical two pole magnet 40 is illustrated in FIG. 2 between a first end piece 42 and a second end piece 44. The first and second end pieces 42, 44 are made of non-magnetizable material, which will be attached to the two ends of the solid cylindrical two-pole magnet 40.

Obviously, it is desireable that the solid cylindrical two-pole magnet 40 be made of a single piece of magnetizable medium which is then magnetized. However, with the present state-of-the-art in high magnetic energy product permanent magnets, it is not possible to magnetize material greater than approximately three-quarter inch square cross-sectional area, with a number of manufacturers only having the capability of magnetizing material which is five-sixteenths of an inch square cross-sectional area.

Figure 3:
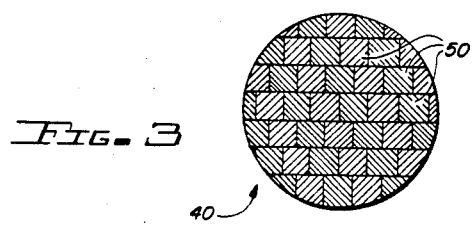
FIG. 3 is an end view of the cylindrical solid magnet used in the rotor illustrated in FIG. 2.

In the example illustrated in FIGS. 2 and 3, five-sixteenths inch by five-sixteenths inch by 1 inch magnet blocks 50 are utilized to construct the 6 inch long, 2 3/16th inch diameter solid cylindrical two-pole magnet 40. The magnet blocks 50 may be bonded together using contact cement, with each of the magnet blocks 50 aligned with the same axis of magnetic polarity to produce a diametrically magnetized construction in the solid cylindrical two pole magnet 40. Adjacent magnet blocks 50 overlap each other for greater strength. Following construction of the magnets blocks 50 into a unit, they are machined to rough size, with the ends of the solid cylindrical two-pole magnet 40 being machined flat in the preferred embodiment. It should be noted that it is possible that the magnet 40 and the end pieces 42, 44 could be machined to a non-flat surface, as, for example, conical surface, but from an economic standpoint flat surfaces are preferred.

The first and second end pieces 42, 44 are then bonded to the solid cylindrical two-pole magnet 40 using contact adhesive, such as for example Eastman 910, and the rotor assembly 60 illustrated in FIG. 2 is then machined to have a cylindrical outer surface. It is important that the first and second end pieces 42, 44 have a portion which is the same diameter as the solid cylindrical two-pole magnet 40 so that the rotor, when finished will have sufficient stiffness. For the example illustrated in FIG. 2, the width at the outer diameter of the first and second end pieces 42, 44, having the same diameter as the solid cylindrical two pole magnet, is approximately 0.4 inches.

An outer retaining hoop 70 is then inserted over the rotor assembly 60, with the shell covering the entire solid cylindrical two-pole magnet 40 as well as the portions of the first and second end pieces 42, 44 having the same diameter as the solid cylindrical two-pole magnet 40. The typical method of installing the retaining hoop 70 on the rotor assembly 60 is by heat shrinking the outer retaining hoop 70 onto the rotor 60. Generally, the retaining hoop 70 is heated while the rotor assembly 60 is cooled, after which the hoop 70 is inserted over the rotor assembly 60. As the hoop 70 assembly cools, it shrinks and forms a high interference fit with the rotor assembly 60. In certain applications, it may also be desireable to weld the retaining hoop 70 onto the rotor assembly 60, although it has been found that the high interference fit of the hoop 70 on the rotor assembly 60 without welding is generally acceptable.

High energy permanent magnets are typically very sensitive to heat, and the operation of fitting the retaining hoop 70 onto the rotor assembly 60 using a heat-shrink fit may affect the magnetic characteristics of the rotor assembly 60. While samarium cobalt magnets may be utilized in a rotor assembly 60 with a heat-shrink fitted retaining hoop 70 without substantial problem, neodymium-iron-boron magnets are three times as sensitive to heat as samarium cobalt magnets. Accordingly, a different technique must be used to insert the retaining hoop 70 over the rotor assembly 60 when the magnets are neodymium-iron-boron magnets.

Figure 5:
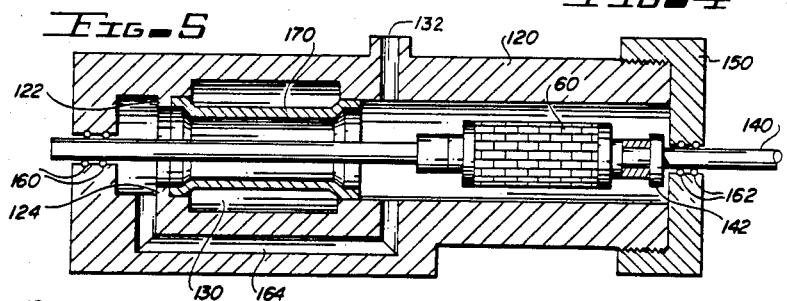
FIG. 5 is a cross-sectional view of a hydraulic press used to install the assembled rotor of FIG. 2 into the retaining hoop without using heating.

The alternative embodiment uses hydraulic pressure to slightly expand a retaining hoop 170 to allow the rotor assembly 60 to be inserted into the retaining hoop 170, as illustrated in FIG. 5. A housing 120 made of non-ferromagnetic material open at one end is designed to receive the hoop 170, which has a diameter at the ends thereof which is slightly larger than the diameter of the portion intermediate the ends. The hoop 170 is positioned in the housing 120 with its inward movement limited by tabs 122, 124 made integrally with the housing 120. The portions of the housing 120 around the outside of the intermediate portion of the hoop 170 contain an annular recessed area 130 in which hydraulic pressure will not be present, and which may be vented. It is thus apparent that when the interior of the housing 120 is supplied with pressurized hydraulic fluid through an inlet 132, the hoop 170 will be caused to expand outwardly, slightly increasing its inner diameter.

The rotor assembly 60 is placed on a hydraulic ram 140 extending through the housing 120 and having an integral plate 142 to force the rotor assembly 60 into the hoop 170. The housing 120 is sealed at its open end by a cover 150 which may be screwed onto the housing 120, and through which the hydraulic ram 140 extends. The hydraulic ram 140 is sealed by packing 160, 162 in the housing 120 and the cover 150.

Hydraulic pressure is supplied to the housing 120, causing the hoop 170 to expand radially outwardly. The hydraulic ram 140 then forces the rotor assembly 60 into the hoop 170, with proper placement being limited by contact of the rotor assembly 60 with the closed end of the housing 120. During this operation, supply of hydraulic pressure to the interior of the hoop 170 is ensured by providing a hydraulic passage 164 in the housing 120 to equalize pressure on both ends of the hoop 170.

By using this embodiment, it is not necessary to heat the retaining hoop 170. Accordingly, the chance of damaging the magnet 40 by heating it when the hoop 170 is installed on the rotor 60 is completely eliminated.

Figure 6:
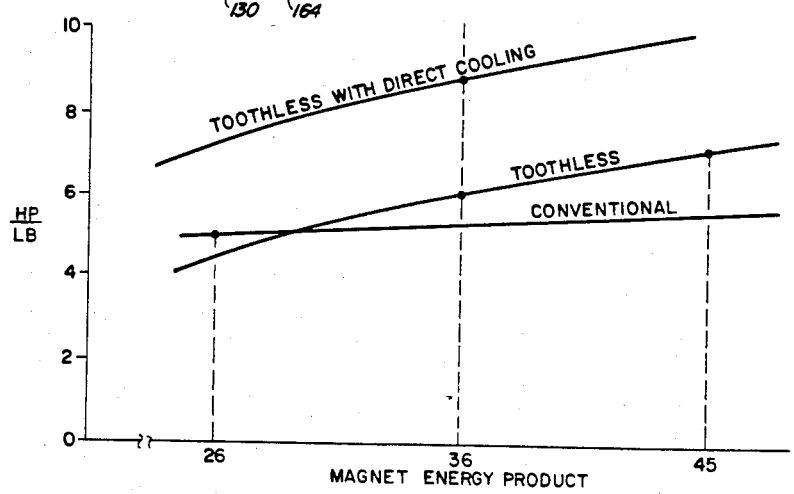
FIG. 6 is a graph of power per weight versus magnet energy product for a conventional machine, and a machine using both a toothless stator and the rotor of the present invention, the latter being shown both with and without direct liquid cooling.

Performance of a machine built according to the teachings of the present invention both with and without direct liquid cooling of the stator is illustrated in FIG. 6 as compared with a conventional machine. It is apparent that for high energy product permanent magnets the design using the rotor of the present invention in combination with a toothless stator, particularly a toothless stator with liquid cooling, is substantially more efficient than a conventional machine. By utilizing a rotor constructed according to the teachings of the present invention in combination with a toothless stator, it is apparent that a machine smaller both in size and weight than conventional machines may be constructed to provide a given power output.

For the example used above with the solid cylindrical two pole magnet 40 being constructed of five-sixteenths inch by five-sixteenths inch by one inch samarium-cobalt magnets, a machine may be produced which will operate at 45,000 rpm and produce 85 horsepower as a motor or generate 63 Kilowatts as a generator. It is therefore apparent that the rotor of the present invention may be used to produce a machine having a high power output per volume ratio. Additionally, since the rotor of the present invention is constructed of four parts rather than the typical twelve parts used in a rotor, labor cost due to machining and part cost of the rotor are reduced. The rotor of the present invention is therefore more inexpensive to manufacture than previous rotors while also possessing substantially higher performance characteristics. Accordingly, it may be perceived that the rotor of the present invention represents a significant step in the state-of-the-art and a highly advantageous construction for electrical machines.

What is claimed is:

1. A method of making a two pole magnet rotor for an electrical machine, comprising the step of:
   forming a cylindrical two pole permanent magnet from a plurality of small magnet blocks aligned with the same axis of magnetic polarity assembled in a solid overlaying relationship;
   bonding a first end piece onto one end of said cylindrical two pole permanent magnet;
   bonding a second end piece onto the other end of said cylindrical two pole permanent magnet; and
   installing a thin cylindrical retaining hoop in interference fit fashion around said cylindrical two pole permanent magnet and the portions of said first and second end pieces adjacent to said cylindrical two pole permanent magnet.

2. The method of claim 1 wherein said plurality of small magnet blocks are magnetized prior to forming the cylindrical two pole permanent magnet.

3. the method of claim 1 wherein said plurality of small magnetic blocks are adhesively bonded.

4. The method of claim 1, wherein said installing step is a heat shrink operation.

5. The method of claim 1, wherein said installing step comprises:
   expanding the interior of said retaining hoop radially outwardly using hydraulic pressure; and
   sliding said cylindrical two pole permanent magnet and the portions of said first and second end pieces adjacent thereto into said retaining hoop.

6. A method of making a two pole permanent magnet rotor for an electrical machine comprising the steps of:
   assembling and bonding together a plurality of small magnet blocks in overlaying relationship with aligned axis of magnetic polarity to form a solid cylinder of magnetic material having the magnetic axis aligned along a diameter of the cross section of said solid cylinder and all magnetic flux lines through said solid cylinder of magnetic material parallel to the magnetic axis;
   bonding a first end piece of non-magnetizable material at one end of said solid cylinder of magnetic material;
   bonding a second end piece of non-magnetizable material mounted at the other end of said solid cylinder of magnetic material; and
   retaining said solid cylinder of magnetic material and those portions of said first and second end pieces adjacent to said solid cylinder of magnetic material within a thin cylindrical hoop.

7. The method as defined in claim 6, wherein said assembling step comprises:
   stacking said plurality of magnet blocks to form a basically cylindrical shape;
   machining said basically cylindrical shape to a smooth cylindrical outer surface having a diameter; and
   machining the ends of said basically cylindrical shape flat.

8. The method as defined in claim 7, wherein said assembling step additionally comprises:
   magnetizing each of said plurality of magnet blocks prior to assembly into said basically cylindrical shape.

9. The method as defined in claim 7, wherein said stacking step comprises:
   using a contact adhesive to retain said plurality of magnetic blocks in said basically cylindrical shape.

10. The method as defined in claim 6, wherein said installing step is a heat shrink operation.

11. The method as defined in claim 6, wherein said installing step comprises:
    expanding the interior of said retaining hoop radially outwardly using hydraulic pressure; and
    sliding said cylindrical two pole permanent magnet and the portions of said first and second end pieces adjacent thereto into said retaining hoop.

* * * * *